United States Patent [19]

Notarianni

[11] Patent Number: 5,586,002

[45] Date of Patent: Dec. 17, 1996

[54] PROTECTIVE CASE AND INTERFACE HOUSING CONTAINING COMPUTER DEVICES AND THE LIKE

[75] Inventor: John Notarianni, 47 Alhambra Rd., Massapequa, N.Y. 11758

[73] Assignee: John Notarianni, Babylon, N.Y.

[21] Appl. No.: 149,962

[22] Filed: Nov. 10, 1993

Related U.S. Application Data

[62] Division of Ser. No. 903,675, Jun. 24, 1992, abandoned.

[51] Int. Cl.$^6$ .................................. G06F 1/16; H05K 7/16
[52] U.S. Cl. .......................... 361/681; 361/683; 361/727; 348/920; 312/223.2
[58] Field of Search .................................. 439/928, 928.1; 364/708.1; 248/920; 340/407.1, 407.2; 345/905; 312/223.2, 244, 319.2, 223.6, 902, 138.1; 361/679–686

[56] References Cited

U.S. PATENT DOCUMENTS

| | | | |
|---|---|---|---|
| 1,324,415 | 12/1919 | Smith | 312/319.2 X |
| 4,545,023 | 10/1985 | Mizzi | 361/680 X |
| 4,658,956 | 4/1987 | Takeda et al. | 206/320 |
| 4,736,332 | 4/1988 | Crease | 364/708.1 |
| 4,790,431 | 12/1988 | Reel et al. | 312/223.2 |
| 4,794,634 | 12/1988 | Torihata et al. | 379/96 |
| 4,803,652 | 2/1989 | Maeser et al. | 364/708.1 |
| 5,021,922 | 6/1991 | Davis et al. | 361/680 |
| 5,105,335 | 4/1992 | Honda | 361/679 |
| 5,106,322 | 4/1992 | Cesar | 361/683 X |

FOREIGN PATENT DOCUMENTS

| | | | |
|---|---|---|---|
| 0180317 | 1/1907 | Germany | 312/138.1 |

*Primary Examiner*—Michael W. Phillips
*Attorney, Agent, or Firm*—Hoffman & Baron

[57] ABSTRACT

A combination formed in accordance with the present invention includes a pen based computer and the like, the pen based computer having a display screen. The combination also includes a protective case and interface housing, for containing the pen based computer and the like, which includes a housing having a top wall, a bottom wall and lateral walls defining a box-like structure. The top wall of the housing has an opening so that the display screen of the pen based computer contained in the protective case can be accessed. The housing has a universal exterior dimension and a variable interior dimension to correspond to the exterior dimensions of each manufacturer's pen based computer. The protective case and interface housing includes slots in which an input/output connector and a power connector are mounted. These connectors are coupled to the input/output connector and power connector of the pen based computer by cables having mating connectors.

12 Claims, 4 Drawing Sheets

PROTECTIVE CASE AND INTERFACE HOUSING CONTAINING COMPUTER DEVICES AND THE LIKE

This is a divisional of application Ser. No. 07/903,675 filed on Jun. 24, 1992, now abandoned.

BACKGROUND OF THE INVENTION

1. Field of the Invention

This invention relates to pen based computers and the like, and more particularly relates to a protective case and interface housing in which a pen based computer may be placed and operated.

2. Description of the Prior Art

Pen based computers, which are commonly referred to as electronic clipboards, have become increasingly popular forms of portable computers. Such computers basically include a liquid crystal display and an integral tethered pen for handwritten input of information on the display. The pen based computer may be programmed to display a form or a chart with blanks provided for completion by the user who hand writes the information in the appropriate places on the form displayed.

Pen based computers are particularly adapted for use by non-technically trained personnel since the user merely has to follow the form or instructions displayed on the computer. Some pen based computers are small and portable and may be used by field personnel for the input of data which is to be transferred to a mainframe computer at a home office. For example, an electric utility may use pen based computers for its meter readers or they may be used in a power plant where gauges need to be periodically monitored and their readings recorded.

The main advantages to using pen based computers are that the computer may be programmed with simple forms and instructions for use by non-technical personnel and the computers are lightweight and portable. Therefore, pen based computers are well suited for recording data gathered by field personnel which is later transferred to a mainframe computer located in a home office.

Since the pen based computers are well suited for field use, there is a need for a durable protective case in which the computer may be housed, so that, if the computer is inadvertently dropped, only the less expensive protective case will be damaged.

As previously mentioned, pen based computers are well suited for collecting data by field personnel. Generally, the data collected is transferred to a mainframe computer located in the home office. The transfer of data may take place through an apparatus having multiple receptacles which is capable of transferring data from a plurality of pen based computers housed within the apparatus, such as disclosed in U.S. Pat. No. 5,301,346 issued Apr. 5, 1994, and entitled "Method and Apparatus for Transferring Data between a Host Device and Plurality of Portable Computers" the disclosure of which is incorporated herein by reference.

Preferably, the pen based computer is inserted into the apparatus so that the input/output (I/O) connector of the pen based computer is connected to the I/O connector of the data transfer apparatus. Similarly, the power connector is positioned such that a connection is made with an apparatus receptacle for recharging the internal batteries of the pen based computer. Each computer manufacturer positions its I/O connector and power connector at different locations on the housing for the pen based computers. Therefore, there is a need to provide a universal connection point for the I/O connector and power connector so that any pen based computer may be inserted into the apparatus for transferring data so that a proper connection is made.

Since the data collected on a daily basis needs to be transferred to a mainframe computer, the pen based computer is connected and disconnected from a data transfer device thousands of times over the life of the computer. The number of times a connection and disconnection are made should be limited since the input/output connector may wear out thereby making data transfer impossible or alternatively, some of the data may be irretrievably lost. Replacement of the input/output connector on a pen based computer is relatively expensive and time consuming. Therefore, there is a need for a device which limits the number of connections and disconnections made at the pen based computer input/output connector.

Following transfer of collected field data to a home office mainframe, it is desirable to recharge the internal batteries of the pen based computer for use the next day. The power connector may also wear upon repeated daily use. Therefore, there is a need for an interface housing for receiving a pen based computer having input/output and power connectors located on the interface housing so that minimal connections and disconnections are made at the pen based computer connectors.

OBJECTS AND SUMMARY OF THE INVENTION

It is an object of the present invention to provide a protective case for housing a pen based computer or the like.

It is another object of the present invention to provide a protective case and interface housing for a pen based computer having an external input/output connector coupled to a pen based computer input/output port for transferring data from the pen based computer.

It is a further object of the present invention to provide a protective case having a universal exterior size yet having an internal structure conformable for housing pen based computers made by various manufacturers and having different external dimensions.

It is still a further object of the present invention to provide an interface housing for a pen based computer or the like which limits the number of connections and disconnections made at the pen based computer connectors and thus the wear on the connectors for transferring data and recharging the internal batteries of the pen based computer.

It is yet another object of the present invention to provide a protective case for a pen based computer which is impact-resistant and will protect the pen based computer or the like from inadvertent impact with the ground or other objects.

It is another object of the present invention to provide a protective case having a universal exterior size as well as a universally positioned input/output connector and power connector for connection to an apparatus for transferring data from the pen based computer or the like to a mainframe computer.

It is a further object of the present invention to provide a protective case having an interior specifically molded for each manufacturer's exterior dimensions of pen based computers or the like.

In accordance with one form of the present invention, a protective case and interface housing for pen based computers and the like includes an integrally formed housing having a top wall, an opposite bottom wall and at least three lateral walls joining the top and bottom walls. The top and bottom walls and two opposite lateral walls define a side opening in the housing for receiving a pen based computer. The top wall has an opening formed through the thickness thereof to allow access to a display screen of a pen based computer which is inserted into the housing through the side opening of the housing. The housing also includes one or more slots which may be formed through the thickness of one of the lateral walls for mounting a data interface and power connector on the housing.

The protective case of the present invention may include a door pivotally mounted on the housing, the door being positioned on the housing and dimensioned to cover the side opening of the housing. The door is pivotable to an open position to allow a pen based computer to be inserted into and removed from the housing, and a closed position to enclose and secure the pen based computer in the housing. The housing and door may preferably include a latching mechanism for maintaining the door in the closed position. The protective case may also include a handle preferably mounted on one of the lateral walls of the housing. The handle permits the user of the protective case to easily carry the pen based computer while collecting data.

The protective case and interface housing formed in accordance with the present invention may also include a protective cover pivotally mounted on the housing and positioned to cover and uncover the opening formed in the top wall of the housing. The protective cover is positioned above the pen based computer display screen when in the closed position and may be placed in an open position to allow access to the display screen of the pen based computer.

The protective case and interface housing formed in accordance with one form of the present invention also includes a data transfer cable and a power cable. The cables are respectively coupled at one end to the corresponding data interface and power connectors mounted on the housing, and include a connector at the other end for mating with the interface and power connectors of the pen based computer and the like. These cables and connectors allow a single connection to the pen based computer to be made. However, the connectors mounted in the housing slots of the protective case are used for daily connections and disconnections with a data transfer apparatus. Therefore, the wear and tear is placed on the protective case input/output connector and power connector, and the connectors of the pen based computer are not subjected to any daily connections and disconnections.

The protective case has a universal exterior dimension while the interior of the protective case is specifically formed to conform to and accommodate the specific external dimensions of different manufacturer's pen based computers. Internal pads of styrofoam or the like having different thicknesses may be selectively placed inside the housing between the housing walls and the pen based computer to prevent the computer from shifting in the housing and to center the computer within the top opening formed in the housing. The protective case is formed from an impact resistant material to provide impact and abrasion resistance to a pen based computer inserted into the protective case.

In accordance with a preferred embodiment of the present invention, a combination formed in accordance with the present invention includes a computer device having a computer interfaceable display for inputting data by the user and for displaying data to the user and, further, the computer device includes a data interface connector and/or a power connector. The computer device, in a preferred embodiment, may be a pen based computer. The combination of the present invention also includes a protective case and interface housing for the computer device. The protective case and interface housing, itself, includes a housing dimensioned for receiving the computer device wherein the housing includes an opening such that the computer device can be removably positioned within the housing through such opening. Further, the protective case and interface housing includes closure means selectively positionable to an open or closed position over the housing opening for removably securing the computer device within the housing such that when the closure means is in the closed position the computer device is secured within the housing. The closure means preferably includes a door. Still further, the protective case and interface housing includes means for permitting access by the user to the user interfaceable display of the computer device when the closure means is in the closed position. This user access permitting means, which preferably is an opening, is disposed in alignment with the user interfaceable display of the computer device. Lastly, the protective case and interface housing of the combination formed in accordance with the present invention includes a connector mounted on the housing, the connector being electrically coupled to the computer device.

A preferred form of the protective case and interface housing, as well as other embodiments, objects, features, and advantages of this invention, will be apparent from the following detailed description of illustrative embodiments thereof, which is to be read in conjunction with the accompanying drawings.

DETAILED DESCRIPTION OF THE PREFERRED EMBODIMENTS

Figure 1:
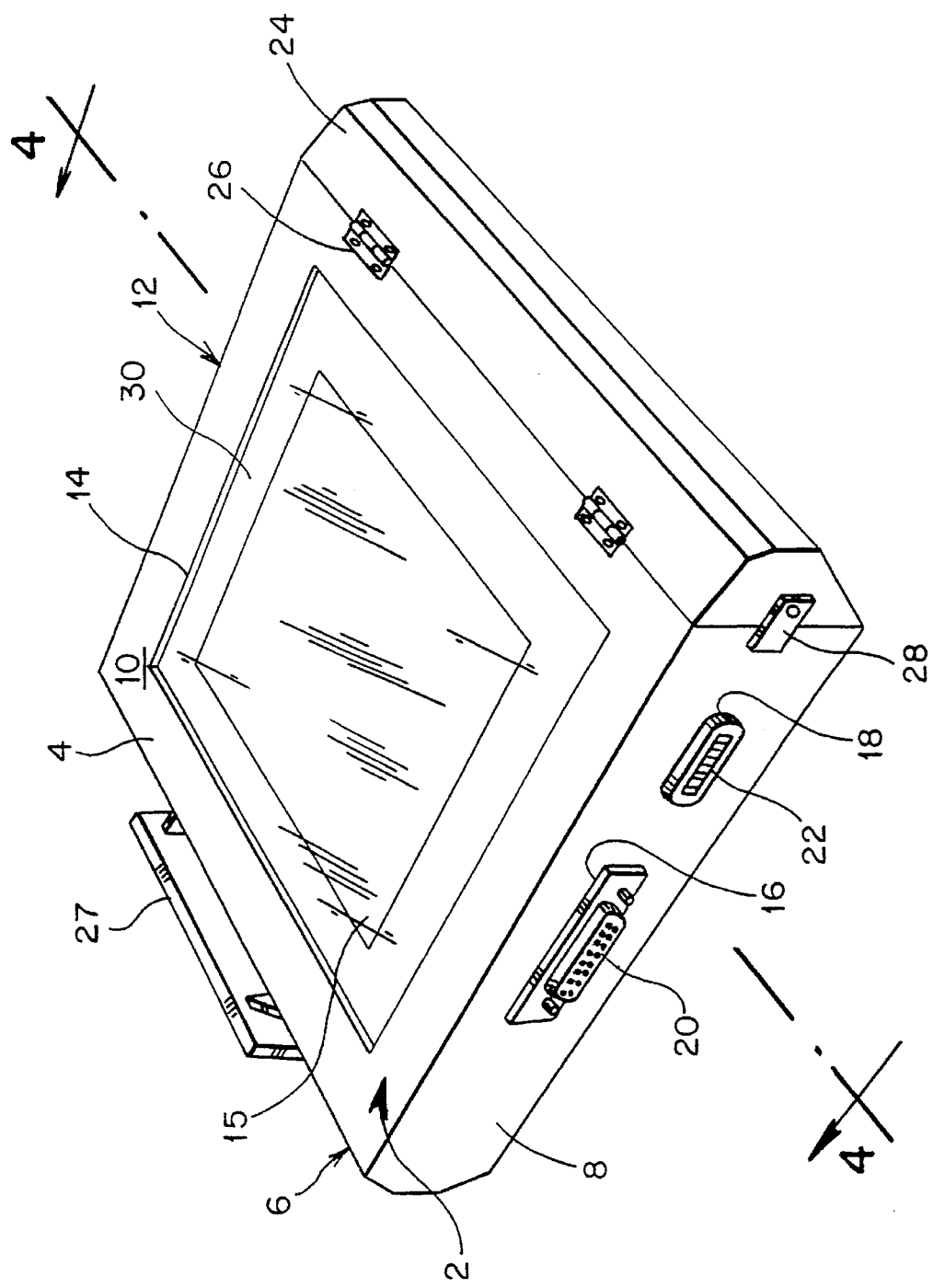
FIG. 1 is a side perspective view of a protective case and interface housing for a pen based computer formed in accordance with the present invention.

A protective case and interface housing for pen based computers and the like, constructed in accordance with the present invention as illustrated in FIGS. 1–4, basically includes an integrally formed housing 2 having a top wall 4, a bottom wall 5 situated opposite the top wall, and first, second and third lateral walls 6, 8, 12, respectively, joined to and disposed between the top 4 and bottom wall 5. The second and third lateral walls 8, 12 are opposite one another and, with the top and bottom walls 4, 5, define a side opening in the housing for receiving a pen based computer 30.

The top wall 4 contains an opening 14 formed through its thickness to allow access to a display screen of a pen based computer which is inserted into the housing 2 through the side opening.

The housing 2 includes one or more slots formed through its thickness for receiving and mounting connectors on the housing. Preferably, two slots 16, 18 are formed in the second lateral wall 8 of the housing, and a data interface connector 20 and power connector 22 are mounted on the second lateral wall 8 through the slots 16, 18 respectively. As will be explained in greater detail, the two connectors are adapted to be electrically coupled to corresponding data and power connectors mounted on the pen based computer and the like.

The protective case and interface housing of the present invention also includes a door 24. The door 24 is pivotally mounted on the housing, and is positioned on the housing and dimensioned to cover the side opening. The door 24 is pivotable to an open position to allow a pen based computer 30 to be inserted into and removed from the housing 2, and a closed position to enclose and secure the pen based computer 30 in the housing 2.

FIG. 1 is a perspective view of one preferred form of the present invention having a pen based computer 30 inserted into the protective case 10. The protective case 10 preferably includes a handle 27 mounted on and extending outwardly from the first lateral wall 6, making the case and a pen based computer mounted in the case easier to carry by field personnel collecting data.

The housing 2 of the protective case 10 and interface housing preferably has a generally rectangular box shape with a universally sized and shaped exterior surface so that it may be placed into an apparatus for transferring data collected on a pen based computer to a mainframe computer, such as the apparatus disclosed in U.S. Pat. No. 5,301,346 issued Apr. 5, 1994, and entitled "Method and Apparatus for Transferring Data Between a Host Device and a Plurality of Portable Computers" the disclosure of which is incorporated herein by reference. The universal exterior surface size and shape of the interface housing of the present invention permit a variety of pen based computers having different exterior dimensions to be inserted into the apparatus for transferring data and used in conjunction with the same data transferring apparatus, without the need to modify the apparatus for each type of pen based computer.

Figure 3:
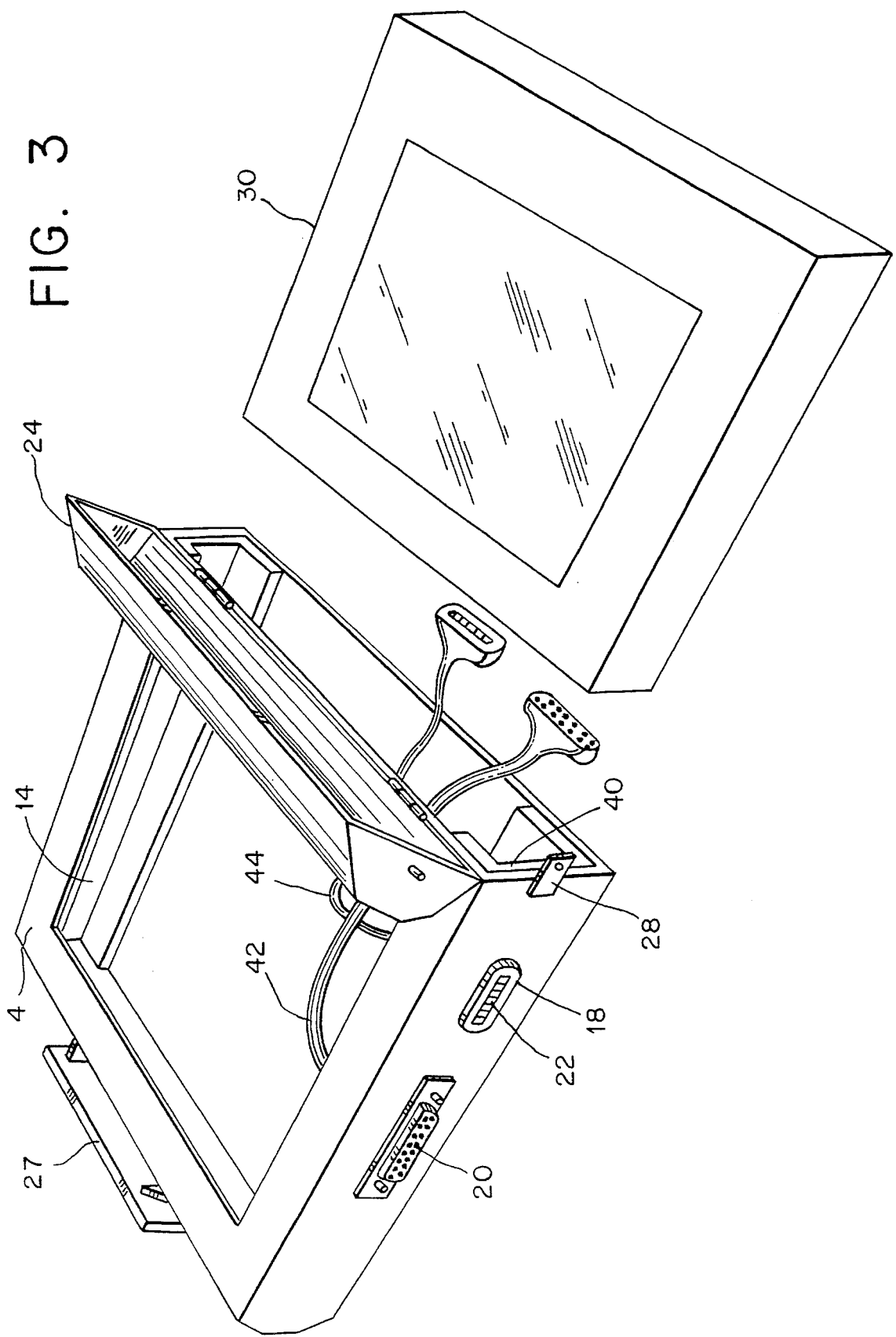
FIG. 3 is a perspective view of a protective case formed in accordance with the present invention and a pen based computer situated prior to insertion into the protective case.
Figure 4:
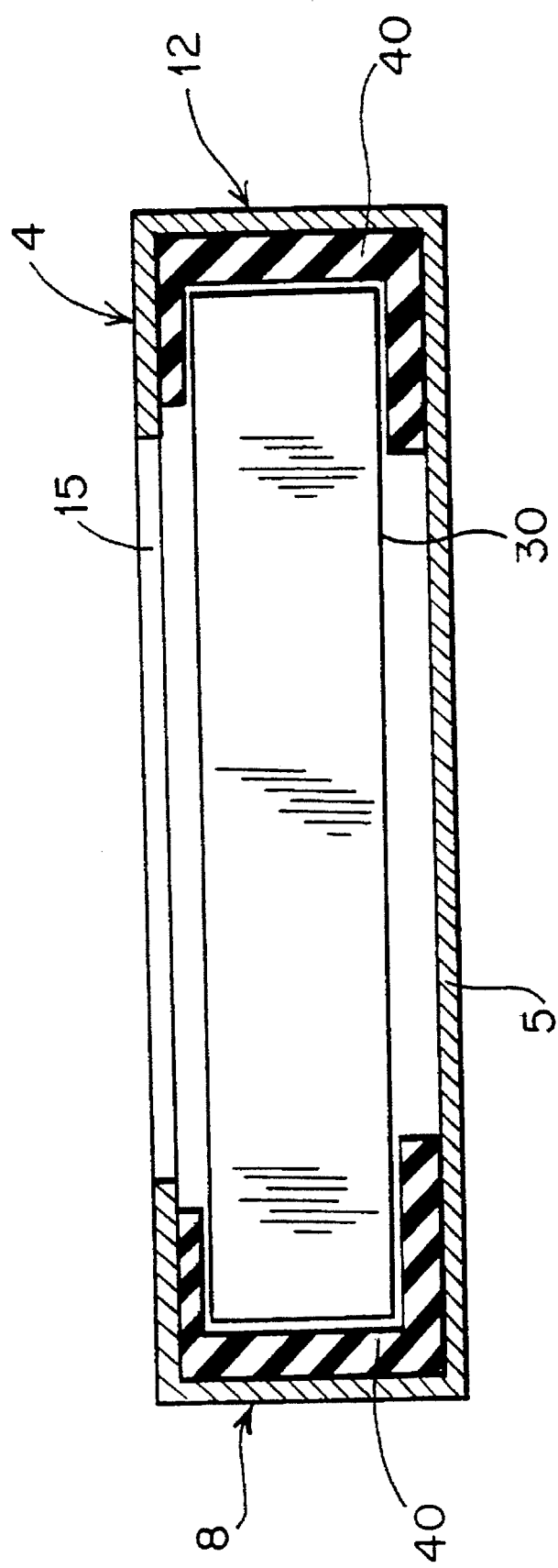
FIG. 4 is a cross sectional view of the protective case and interface housing of the present invention shown in FIG. 1 taken along line 4—4 of FIG. 1.

The protective case and interface housing of the present invention also includes specially molded interior side pads 40 which are mounted on the inside of the housing adjacent the interior surface of the lateral walls, such as opposite second and third walls 8, 12, as shown in FIGS. 3 and 4. The interior side pads 40 are formed in a variety of sizes, shapes and thicknesses and are preferably removable so that they may be replaced by different sized and shaped pads. Thus, the interior surface of the protective case defined by the side pads 40 closely conforms to the exterior size and shape of any one of a number of pen based computers to securely retain the pen based computer inside the housing 2 without the computer shifting or moving in position within the housing and to align the computer's display with the top opening 14 formed in the housing. Preferably, the side pads 40 are formed from a elastomeric, resilient or shock-absorbing material, such as styrofoam, rubber or the like. These materials are used not only so that the pads may easily conform to the size and shape of the pen based computer and the computer is snugly retained in position within the housing 2 but also to provide shock-absorbing protection for the computer should the case be accidently dropped.

As previously noted, the information collected by field personnel on a pen based computer may be transferred to a mainframe computer through an apparatus for transferring data, the apparatus generally having multiple receiving slots to receive a plurality of pen based computers. The apparatus generally includes a corresponding I/O connector and power connector positioned within each receiving slot to mate with corresponding connectors of the pen based computers so that data may be transferred from and to the pen based computers and the internal batteries of the pen based computers may be recharged following the transfer of the data. Since each pen based computer manufacturer positions its I/O connector and power connector in different locations, the connectors may not properly align with the apparatus connectors, unless the data transferring apparatus is specifically designed to accommodate that particular pen based computer. With the protective case and interface housing of the present invention, the location of the connectors on the housing is fixed and always aligns with the connectors of the data transferring apparatus, no matter which pen based computer is used.

As mentioned previously, the protective case 10 formed in accordance with the present invention includes a door 24 which covers the side opening and essentially forms one lateral wall of the housing. The door 24 is pivotally mounted on the protective case housing 2 to cover and uncover the side opening. The door 24 may be pivotally mounted using at least one hinge 26 mounted on the top or bottom wall of the housing to connect the door 24 to the protective case housing 2. The protective case may also include a latching mechanism 28 mounted on the door and one of the housing walls in order to secure the door 24 in a closed position once a pen based computer 30 has been inserted into the protective case 10. The latching mechanism 28 may be formed of a simple device such as a latching clip, or may formed from overlapping hook and loop fasteners mounted on the door 24 and a housing wall. Alternatively, as shown in FIG. 2, the latching mechanism 28 may be formed of a device such as a hasp comprising a hinged strap 29 and cooperating staple 31 and miniature padlock 33 which both latches and locks the door closed to prevent the pen based computer 30 from being withdrawn from the protective case 10 without authorization.

As mentioned previously, the protective case 10 of the present invention has an opening 14 formed through the thickness of the top wall 4 of the housing 2 so that a liquid crystal display area (display screen) of a pen based computer situated inside the housing 2 may be accessed. Presently, there are two types of pen based computers. The first type requires the pen to be connected to the pen based computer by a cable, i.e., a tethered pen. The second type of pen based computer uses an inductive pen which does not need to be connected by a cable to the pen based computer. FIG. 2 illustrates an embodiment of the present invention which may be used with a pen based computer 30 having its pen 32 connected to the computer 30 by a cable 34. The protective case housing 2 includes an opening 36 formed through a housing wall, such as the third lateral wall 12 opposite the second lateral wall 8 on which the connectors are mounted, and through which the pen 32 and cable 34 may pass. In order for this type of pen based computer to operate, the pen 32 must come directly in contact with the computer display screen exposed by the opening 14 in the top 4 of the housing 2. The preferred embodiment of the present invention also includes a pen holder clip 38 mounted on the third lateral wall 12 of the housing 2 for removably securing the pen 32 to the protective case 10.

Figure 2:
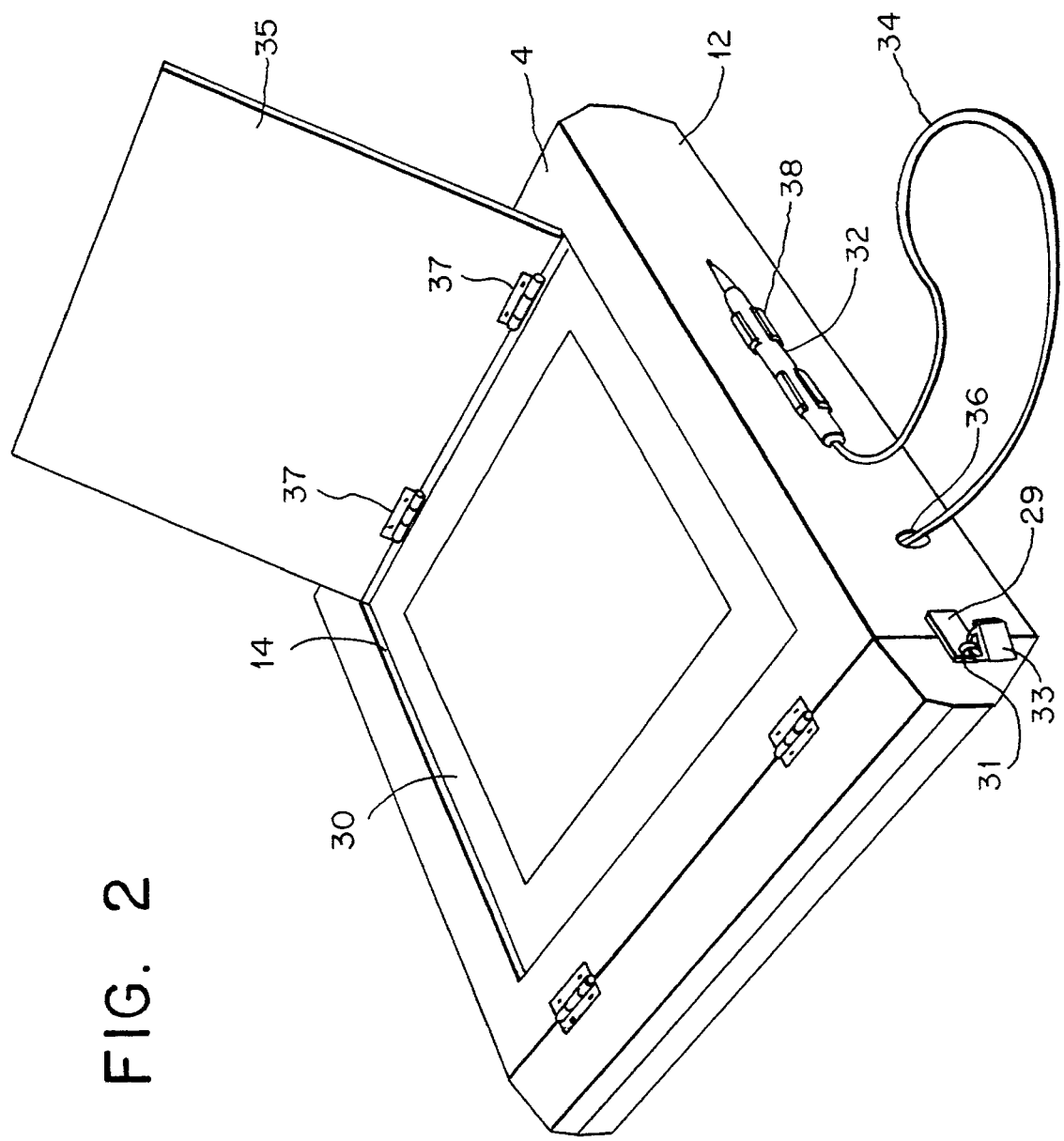
FIG. 2 is a side perspective view of a protective case for a pen based computer formed in accordance with the present invention illustrating the opposite side of the protective case shown in FIG. 1.

Referring to FIG. 2, the protective case 10 may include a protective cover 35 positioned over the opening 14 for the display screen of the pen based computer. The protective cover 35 is preferably pivotally secured to the protective case housing 2 by hinges 37 mounted on the top wall 4 so that it may be opened to allow access to the display screen of the pen based computer. The protective cover 35 may be placed in a closed position, covering the display screen of the pen based computer, when the pen based computer 30 is not in use. The protective cover 35 provides impact and abrasion protection to the display screen of the pen based computer 30. The protective cover 35 also provides a barrier for dirt and other debris which may come in contact with the display screen of a pen based computer 30 being carried by field personnel.

Alternatively, for pen based computers that do not require a cable connecting the pen to the pen based computer (i.e., inductive pen type computers), the protective case opening 14 may be covered with a protective sheet 15 formed of a transparent or translucent material, as illustrated in FIG. 1. The protective sheet 15 is preferably formed of a thin transparent or translucent plastic material to permit operation of the inductive pen through the sheet 15 with the pen based computer 30. The protective sheet 15 provides impact and abrasion protection as well as protection against dirt and other debris from contacting the display screen of the pen based computer. This embodiment of the present invention may also additionally include the pivotable protective cover 35 covering the transparent protective sheet, as previously described, for further protection of the pen based computer display screen when not in use.

Referring to FIG. 3, the protective case 10 of the present invention is illustrated with the door 24 in an open position and the pen based computer 30 situated outside the protective case 10 prior to its insertion into the case. The pen based computer 30 is electrically coupled to the connectors of the protective case 10 by a data transfer cable 42 and a power cable 44. More specifically, the data transfer cable 42 is coupled at one end to the interface connector 20 mounted on the housing and at the other end has an I/O connector coupled to it for mating with the I/O connector of the pen based computer 30. The power cable 44 is coupled at one end to the power connector 22 mounted on the housing and the other end has a power connector coupled to it for mating with a power connector located on the pen based computer 30. It is envisioned, of course, to use a single connector, such as connector 20, mounted on the housing to carry both data signals and power between the housing and the computer either with a single cable or two separate cables.

Depending on the particular manufacturer's specifications, the I/O port and power receptacle for the pen based computer 30 might be positioned on any side of the computer, such as shown in FIG. 3, which may not be compatible with a data transfer and charging apparatus. An advantage of the present invention, therefore, is that it provides a universal connection location for all pen based computers so that the pen based computers of various manufacturers will be compatible with the same data transfer apparatus.

Additionally, connectors on computers have a limited life based on the number of connections and disconnections made. Therefore, an advantage of the protective case and interface housing 10 is that a single connection is made at the pen based computer connectors and the connectors located on the protective case 10 are subjected to the repeated connections and disconnections with the data transfer apparatus. Once the useful life of the I/O and power connectors has been exhausted, the entire protective case, which is of relatively minimal cost, may be discarded and replaced with a new case. Alternatively, the old cable assemblies, including preassembled connectors and cables, may be easily replaced with new cables and connectors and minimal wear is placed on the connectors of the pen based computer 30. Thus, in either situation, the connectors of the pen based computer are subjected to little or no wear. This feature of the present invention obviates the need for expensive and time consuming replacement of worn connectors on the pen based computer 30.

The protective case and interface housing of the present invention is preferably formed of a strong, durable, impact-resistant material. Suitable materials for use include but are not limited to plastics and elastomers. The protective case 10 will provide impact and abrasion resistance for the pen based computer from inadvertent impact with the ground or other objects when being carried by field personnel.

Although the protective case and interface housing of the present invention has been specifically described as being used with pen based computers, it should be understood that the protective case and interface housing may be used with other similar electronic equipment, such as lap top computers, calculators and the like.

Although illustrative embodiments of the present invention have been described herein with reference to the accompanying drawings, it is to be understood that the invention is not limited to those precise embodiments, and that other changes and modifications may be effected therein by one skilled in the art without departing from the scope or spirit of the invention.

What is claimed is:

1. In combination:
    a computer device having a user interfaceable display for inputting data by the user and for displaying data to the user and further including at least one of a data interface connector and a power connector; and
    a protective case and interface housing for the computer device comprising:
    a housing dimensioned for receiving the computer device wherein said housing includes an opening such that the computer device can be removably positioned within the housing through said opening;
    closure means selectively positionable to an open or closed position over the housing opening for removably securing the computer device within said housing such that when said closure means is in said closed position the computer device is secured within the housing;
    means for permitting access by the user to the user interfaceable display of the computer device when the closure means is in the closed position, the user access permitting means being disposed in alignment with the user interfaceable display; and
    a connector mounted on the housing, the connector being electrically coupled to the computer device received by the housing.

2. A combination as defined by claim 1 wherein the user access permitting means defines an opening formed through the thickness of a wall of the housing.

3. A combination as defined by claim 2, further comprising a cover, the cover being mounted on the housing and situated to cover and uncover the opening formed in the wall of the housing.

4. A combination as defined by claim 2, further comprising a translucent protective sheet, the protective sheet being mounted on the housing in alignment with the opening formed in the wall of the housing.

5. A combination as defined by claim 1, wherein the housing comprises an impact-resistant plastic and defines an interior space for receiving the computer device, and wherein the housing includes an interior surface, and wherein the protective case and interface housing further comprises interior side pads, the interior side pads being mounted in the interior space of the housing adjacent the interior surface thereof, the side pads defining an interior surface of the protective case and interface housing which closely conforms to the exterior size and shape of the computer device received by the housing such that the computer device is securely retained therein.

6. A combination as defined by claim 5, wherein the interior side pads are removable from the housing.

7. A combination as defined by claim 5, wherein the interior side pads are formed from an elastomeric and shock absorbing material.

8. A combination as defined by claim 1, further comprising means for latching the closure means in the closed position, the latching means being mounted on the housing and the closure means.

9. A combination as defined by claim 8, wherein the latching means further includes means for locking the closure means in the closed position to prevent unauthorized access to the computer device secured in the housing.

10. A combination as defined by claim 1, further comprising a clip mounted on the housing for securing to the housing a component of the computer device received by the housing.

11. A combination as defined by claim 1, further comprising a handle mounted on the housing for carrying the protective case and interface housing with the computer device contained therein.

12. A combination as defined by claim 1, wherein the computer device is a pen based computer.

* * * * *